United States Patent
Abe et al.

(10) Patent No.: US 10,305,126 B2
(45) Date of Patent: May 28, 2019

(54) FUEL CELL SYSTEM

(71) Applicant: Panasonic Intellectual Property Management Co., Ltd., Osaka (JP)

(72) Inventors: Miki Abe, Osaka (JP); Akinori Yukimasa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 318 days.

(21) Appl. No.: 15/357,868

(22) Filed: Nov. 21, 2016

(65) Prior Publication Data

US 2017/0162890 A1  Jun. 8, 2017

(30) Foreign Application Priority Data

Dec. 3, 2015 (JP) .................................. 2015-236455

(51) Int. Cl.
  *H01M 8/04* (2016.01)
  *H01M 8/04746* (2016.01)
  (Continued)

(52) U.S. Cl.
  CPC ... *H01M 8/04768* (2013.01); *H01M 8/04029* (2013.01); *H01M 8/04052* (2013.01);
  (Continued)

(58) Field of Classification Search
  CPC ......... H01M 8/04768; H01M 8/04029; H01M 8/04052; H01M 8/04067; H01M 8/04358; H01M 8/04723; H01M 8/04291
  (Continued)

(56) References Cited

U.S. PATENT DOCUMENTS

| | | | | |
|---|---|---|---|---|
| 5,678,410 A * | 10/1997 | Fujita | ................. | B60H 1/00007 165/104.12 |
| 7,052,790 B2 * | 5/2006 | Nakamura | ........ | H01M 8/04029 429/410 |
| 9,017,887 B2 * | 4/2015 | Tanaka | .............. | H01M 8/04089 429/429 |

FOREIGN PATENT DOCUMENTS

| | | |
|---|---|---|
| EP | 2555302 A1 | 2/2013 |
| JP | 2006-024430 A | 1/2006 |

(Continued)

OTHER PUBLICATIONS

The Extended European Search Report dated Feb. 17, 2017 for the related European Patent Application No. 16200970.8.

*Primary Examiner* — Anthony R Jimenez
(74) *Attorney, Agent, or Firm* — McDermott Will & Emery LLP

(57) ABSTRACT

A fuel cell system including: a fuel cell that generates electricity; a heat exchanger that exchanges heat between an exhaust gas from the fuel cell and water; a heat dissipator that dissipates heat from the water; a circulation path along which the water circulates between the heat exchanger and heat dissipator; a circulation pump that circulates the water; a first detector that detects the temperature of the water flowing into the heat exchanger; a second detector that detects the temperature of the water flowing out from the heat exchanger; and a controller configured to adjust the circulation pump such that the temperature detected by the second detector becomes a first temperature, and, when the temperature detected by the first detector is equal to or greater than a threshold, adjust the circulation pump such that the temperature detected by the second detector becomes a second temperature higher than the first temperature.

6 Claims, 5 Drawing Sheets

(51) Int. Cl.
  *H01M 8/04029* (2016.01)
  *H01M 8/04007* (2016.01)
  *H01M 8/0432* (2016.01)
  *H01M 8/04291* (2016.01)
  *H01M 8/04701* (2016.01)

(52) U.S. Cl.
  CPC ... *H01M 8/04067* (2013.01); *H01M 8/04291* (2013.01); *H01M 8/04358* (2013.01); *H01M 8/04723* (2013.01)

(58) Field of Classification Search
  USPC .......................................................... 429/437
  See application file for complete search history.

(56) References Cited

FOREIGN PATENT DOCUMENTS

| | | |
|---|---|---|
| JP | 2010-257806 A | 11/2010 |
| JP | 2010-272342 | 12/2010 |
| JP | 2010-277973 | 12/2010 |
| JP | 2013-073903 | 4/2013 |
| JP | 2015-002093 | 1/2015 |
| JP | 2015-022864 | 2/2015 |
| WO | 2010/123146 A1 | 10/2010 |

* cited by examiner

FUEL CELL SYSTEM

BACKGROUND

1. Technical Field

The present disclosure relates to a fuel cell system.

2. Description of the Related Art

In fuel cell systems in which a hydrocarbon is used as a raw material gas, an exhaust gas that is discharged from a fuel cell stack and a reformer contains moisture. Recovery and reuse of this moisture by condensing is commonly carried out in fuel cell systems that are water self-sustaining (a state in which operation continues without receiving replenishment water from outside).

For example, in the fuel cell system of Japanese Unexamined Patent Application Publication No. 2013-73903, a water flow rate regulating unit, which is a water supply means that produces and supplies pure water to a reformer, is provided. This unit is provided with a condenser, a first water storage tank, a condensed water tank, and a pulse pump. Moisture in the exhaust gas from a fuel cell module is condensed by means of the condenser, this condensed water is accumulated in the first water storage tank, pure water obtained by the condensed water being additionally purified is accumulated in the condensed water tank, and thereafter the pure water is supplied to the reformer by means of the pulse pump.

Furthermore, a solid oxide-type fuel cell system of Japanese Unexamined Patent Application Publication No. 2010-277973 is provided with a circulation flow passage that circulates water between a hot water storage tank and a heat exchanger, and a heat-dissipating means that is arranged in the circulation flow passage. Also, by dissipating heat from circulated water by means of the heat-dissipating means, the heat exchange efficiency of the heat exchanger is increased, and the recovery of water vapor in the exhaust gas is increased.

SUMMARY

However, with regard to the prior art disclosed in Japanese Unexamined Patent Application Publication Nos. 2013-73903 and 2010-277973, there is still room for improvement from the viewpoints of convenience, cost, and water self-sustainability. The present disclosure such problems, and an objective thereof is to provide a fuel cell system with which a decline in convenience and an increase in cost are suppressed and water self-sustainability is possible.

In one general aspect, the techniques disclosed here feature a fuel cell system provided with: a fuel cell that generates electricity by a hydrogen and oxygen reaction; a heat exchanger that causes heat to be exchanged between an exhaust gas discharged from the fuel cell and cooling water; a heat dissipator that causes heat to be dissipated from the cooling water; a circulation path along which the cooling water circulates between the heat exchanger and the heat dissipator; a circulation pump that causes the cooling water to be circulated along the circulation path; a first temperature detector that detects the temperature of the cooling water flowing into the heat exchanger; a second temperature detector that detects the temperature of the cooling water flowing out from the heat exchanger; and a controller, in which the controller is configured so as to adjust the output of the circulation pump such that the temperature detected by the second temperature detector becomes a first predetermined temperature, and, when the temperature detected by the first temperature detector is equal to or greater than a threshold value, adjust the output of the circulation pump such that the temperature detected by the second temperature detector becomes a second predetermined temperature that is higher than the first predetermined temperature.

The present disclosure demonstrates the effects of a conventional decline in convenience and an increase in cost being suppressed and water self-sustainability being possible in a fuel cell system.

The aforementioned objective, other objectives, features, and advantages of the present disclosure will become apparent from the following detailed descriptions of preferred embodiments with reference to the appended drawings.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
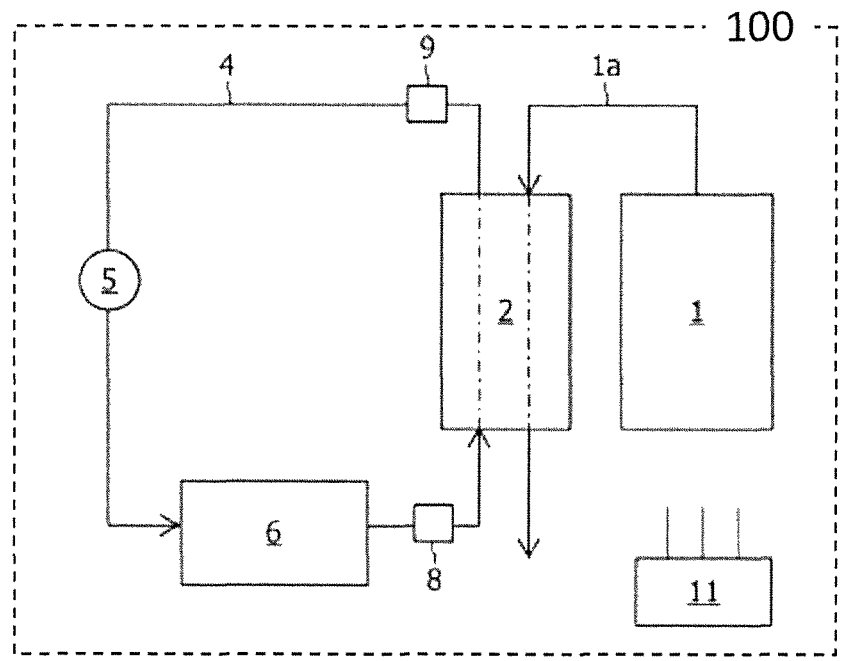
FIG. 1 is a block diagram schematically depicting an example of a configuration of a fuel cell system according to embodiment 1 of the present disclosure.

DETAILED DESCRIPTION (Findings Forming the Basis of the Present Disclosure)

The present inventors carried out a diligent investigation in order to suppress a decline in convenience and an increase in cost and to make water self-sustainability possible for a fuel cell system. As a result, the present inventors found that the prior art has problems such as the following.

Specifically, for water self-sustainability, it is necessary for cooling water that has received heat from the exhaust gas from a fuel cell to be cooled to a temperature at which it is possible to recover condensed water of an amount required for water self-sustainability. However, during the intense heat of the summer, for example, the temperature of the cooling water that cools the exhaust gas may increase. In this case, the cooling capability of the cooling water with respect to the amount of heat of the exhaust gas decreases, and therefore the exhaust gas is not sufficiently cooled, the amount of moisture in the exhaust gas that is condensed is small, and the water recovery rate decreases.

Furthermore, when a fuel cell deteriorates, for example, the amount of heat emitted from the fuel cell increases. In this case, the amount of heat of the exhaust gas with respect to the cooling capability of the cooling water increases, and therefore the exhaust gas is not sufficiently cooled, the amount of moisture in the exhaust gas that is condensed is small, and the water recovery rate decreases. When the water recovery rate decreases in this way, water self-sustainability of the fuel cell system becomes difficult.

In response, in the prior art of Japanese Unexamined Patent Application Publication No. 2013-73903, the power generated by a fuel cell is reduced. Thus, the amount of heat generated by the fuel cell is reduced, thereby reducing the oxidant gas/fuel ratio and facilitating the production of condensed water. However, reducing the generated power irrespective of demand is poor in terms of convenience.

Furthermore, increasing the functionality of a heat-dissipating means by increasing the size and increasing the air flow rate to reduce the temperature of cooling water has been considered in prior art such as Japanese Unexamined Patent Application Publication No. 2010-277973. Thus, the heat dissipation capability of cooling water with respect to the amount of heat of the exhaust gas can be improved, and a decline in the water recovery rate can be suppressed. However, the cost increases as a result of increasing the functionality of the heat-dissipating means.

The present disclosure has been devised on the basis of the abovementioned findings, in which, when the temperature of cooling water in an inlet of a heat exchanger becomes equal to or greater than a predetermined temperature, the output of a circulation pump is adjusted such that the temperature of the cooling water in an outlet of the heat exchanger increases. It thereby becomes possible to suppress a decline in convenience and an increase in cost and to make water self-sustainability possible for a fuel cell system.

A fuel cell system according to a first aspect of the present disclosure is provided with: a fuel cell that generates electricity by a hydrogen and oxygen reaction; a heat exchanger that causes heat to be exchanged between an exhaust gas discharged from the fuel cell and cooling water; a heat dissipator that causes heat to be dissipated from the cooling water; a circulation path along which the cooling water circulates between the heat exchanger and the heat dissipator; a circulation pump that causes the cooling water to be circulated along the circulation path; a first temperature detector that detects the temperature of the cooling water flowing into the heat exchanger; a second temperature detector that detects the temperature of the cooling water flowing out from the heat exchanger; and a controller, in which the controller is configured so as to adjust the output of the circulation pump such that the temperature detected by the second temperature detector becomes a first predetermined temperature, and, when the temperature detected by the first temperature detector is equal to or greater than a threshold value, adjust the output of the circulation pump such that the temperature detected by the second temperature detector becomes a second predetermined temperature that is higher than the first predetermined temperature.

Thus, even when the temperature detected by the first temperature detector becomes equal to or greater than the threshold value, the temperature detected by the second temperature detector is made to become the second prescribed temperature. Thus, the temperature difference between the cooling water flowing along the circulation path and a cooling medium of the heat dissipator becomes larger, and the heat dissipation capability of the heat dissipator improves. Therefore, an increase in the temperature of the cooling water flowing into the heat exchanger is suppressed by the heat dissipator. Thus, in the heat exchanger, the cooling water can cool the exhaust gas from the fuel cell to a temperature required for water self-sustainability, and the moisture in the exhaust gas can be condensed to recover the condensed water required for water self-sustainability. Furthermore, there is no decline in the power generated by the fuel cell or increase in the functionality of the heat dissipator, and therefore a decline in convenience and an increase in cost can be suppressed.

A fuel cell system according to a second aspect of the present disclosure may, in the first aspect, be further provided with a condensed water tank that stores condensed water produced by the exhaust gas discharged from the fuel cell being cooled by the heat exchanger. Thus, condensed water obtained by the moisture in the exhaust gas being condensed can be recovered in the condensed water tank. By using this recovered condensed water as reforming water in a reformer of the fuel cell, the fuel cell system can become water self-sustaining.

A fuel cell system according to a third aspect of the present disclosure may, in the second aspect, be further provided with a supply pump that supplies the condensed water from the condensed water tank to the fuel cell. Accordingly, by supplying the condensed water stored in the condensed water tank to the fuel cell by means of the supply pump, and using the condensed water as reforming water in the reformer of the fuel cell, the fuel cell system can become water self-sustaining.

A fuel cell system according to a fourth aspect of the present disclosure may, in any of the first to third aspects, be further provided with a heat-dissipating fan that blows air to the heat dissipator. Thus, the heat-dissipating fan blows air to the heat dissipator, and the heat-dissipating effect of the heat dissipator can be enhanced.

With regard to fuel cell system according to a fifth aspect of the present disclosure, in the fourth aspect, the controller may be configured so as to, when the temperature detected by the first temperature detector is equal to or greater than the threshold value, adjust the output of the heat-dissipating fan such that the temperature detected by the first temperature detector becomes less than the threshold value, before adjusting the output of the circulation pump such that the temperature detected by the second temperature detector becomes the second predetermined temperature.

In this way, when the temperature detected by the first temperature detector is equal to or greater than the threshold value, the output of the heat-dissipating fan is adjusted such that the temperature detected by the first temperature detector becomes less than the threshold value, and then the output of the circulation pump is adjusted such that the temperature detected by the second temperature detector becomes the second predetermined temperature. Thus, the enhancement of the heat dissipation efficiency of the heat dissipator brought about by the heat-dissipating fan can be utilized to the utmost.

A fuel cell system according to a sixth aspect of the present disclosure may be, in any of the first to fifth aspects, further provided with a hot water storage tank that is provided on the circulation path and stores heat recovered from the heat exchanger. Thus, exhaust heat from the fuel cell can be stored in the hot water storage tank as hot water, and the economic efficiency of the fuel cell system can be improved.

Embodiment 1

<Fuel Cell System Configuration>

First, a configuration of a fuel cell system 100 according to embodiment 1 will be described with reference to FIG. 1. FIG. 1 is a block diagram schematically depicting an example of a configuration of the fuel cell system 100 according to embodiment 1. The fuel cell system 100 is provided with a fuel cell 1, a heat exchanger 2, a circulation path 4, a circulation pump 5, a heat dissipator 6, a first temperature detector 8, a second temperature detector 9, and a controller 11. It should be noted that the direction in which cooling water flows in the circulation path 4 is referred to as upstream and downstream.

The fuel cell 1 is a device that generates electricity by means of a hydrogen and oxygen reaction. The fuel cell 1 is provided with a stack (not depicted) that has an electrolyte and a pair of electrodes arranged on either side of the electrolyte. The fuel cell 1 is classified according to the type of the electrolyte, for example, a phosphoric acid fuel cell, a molten carbonate fuel cell, a solid oxide fuel cell, or a solid polymer fuel cell. Any of these types can be used for the fuel cell 1. A reformer (not depicted) is provided in the fuel cell 1.

The reformer is a reactor that produces the hydrogen required for the generation of power by the fuel cell 1 by means of a reforming reaction. Possible examples of the reforming reaction are a steam reforming reaction, an autothermal reaction, and a partial oxidation reaction. From thereamong, the steam reforming reaction has a higher hydrogen production efficiency compared to the other reactions, and is therefore preferable as the reforming reaction. In this steam reforming reaction, steam is used to reform a raw material gas and produce hydrogen. The raw material gas is a gas including an organic compound made up of at least carbon and hydrogen. Possible examples of the raw material gas are town gas and natural gas in which methane is the main component, and LPG.

It should be noted that devices required for the reforming reaction may be provided in the fuel cell 1, as appropriate, in addition to the reformer. For example, in the case of a reformer in which a steam reforming reaction is used, a combustor (not depicted) that supplies heat required for the reforming reaction, an evaporator (not depicted) that produces steam, a water supplier (not depicted) that supplies water (reforming water) to the evaporator, and the like are provided in the fuel cell 1. Furthermore, an exhaust gas path 1*a* is connected to the fuel cell 1.

The exhaust gas path 1*a* is a path along which a gas (exhaust gas) discharged from the fuel cell 1 flows. The exhaust gas path 1*a* is connected to the fuel cell 1 and a discharge outlet (not depicted) of the fuel cell system 100 or the like. For example, the exhaust gas from the fuel cell 1 is discharged to outside of the fuel cell system 100 via the exhaust gas path 1*a*.

The heat exchanger 2 is a device that causes heat exchange to occur between the exhaust gas from the fuel cell 1 and cooling water flowing along the circulation path 4. The exhaust gas path 1*a* and the circulation path 4 pass through the heat exchanger 2. In the heat exchanger 2, the high-temperature exhaust gas flowing along the exhaust gas path 1*a* is cooled by the low-temperature cooling water flowing along the circulation path 4. This exhaust gas includes moisture, which is produced by the generation of power by the fuel cell 1, in the form of steam. Therefore, when the exhaust gas is cooled to dew point, the steam included in the exhaust gas condenses to produce water (condensed water). This condensed water is supplied to the reformer of the fuel cell 1, and is used as reforming water in the reformer. Meanwhile, the cooling water is heated by the exhaust gas, and flows out to the circulation path 4 downstream from the heat exchanger 2.

The circulation path 4 is a path along which the cooling water circulates between the heat exchanger 2 and the heat dissipator 6. For example, the heat exchanger 2, the second temperature detector 9, the heat dissipator 6, and the first temperature detector 8 are arranged in this order (forward order) on the circulation path 4. Furthermore, the cooling water is circulated so as to pass through these devices in the forward order by the circulation pump 5, which is arranged in an arbitrary location on the circulation path 4.

The circulation pump 5 is a pump that circulates the cooling water along the circulation path 4. The circulation pump 5 is provided on the circulation path 4, and, for example, has a function (flow rate adjustment function) that enables the flow rate of the cooling water circulating through the circulation path 4 to be adjusted. The circulation pump 5 adjusts the flow rate of the cooling water circulating through the circulation path 4, in accordance with a control signal from the controller 11. It should be noted that the flow rate adjustment function may be provided in the circulation pump 5, or may be provided separately from the circulation pump 5 as a component having a flow rate adjustment function.

The heat dissipator 6 is a device that dissipates heat from the cooling water. The heat dissipator 6 is a heat exchanger that is provided on the circulation path 4, and causes heat exchange to occur between the cooling water flowing along the circulation path 4 and a cooling medium. A possible example of the heat dissipator 6 is a radiator in which the cooling medium is air. However, the cooling medium is not restricted to air, and a gas other than air, a liquid, or the like may be used. In the case where the heat dissipator 6 is a radiator, heat of the cooling water discharged from the heat exchanger 2 is emitted into the atmosphere, and the cooling water is cooled.

The first temperature detector 8 is a temperature detector that detects the temperature (inflow temperature) of cooling water flowing into the heat exchanger 2. The first temperature detector 8 outputs a detected temperature (first detected temperature) to the controller 11 as the inflow temperature of the cooling water. Here, the first temperature detector 8 is provided upstream from the heat exchanger 2 and downstream from the heat dissipator 6 on the circulation path 4. However, the first temperature detector 8 may be arranged in a location at which the inflow temperature of the cooling water can be detected, for example, a location in the circulation path 4 corresponding to an inlet for the cooling water in the heat exchanger 2. Possible examples of the first temperature detector 8 are thermocouple and thermistor temperature detecting elements, or the like.

The second temperature detector 9 is a temperature detector that detects the temperature (outflow temperature) of cooling water flowing out from the heat exchanger 2. The second temperature detector 9 outputs a detected temperature (second detected temperature) to the controller 11 as the outflow temperature of the cooling water. Here, the second temperature detector 9 is provided downstream from the heat exchanger 2 on the circulation path 4. However, the second temperature detector 9 may be arranged in a location at which the outflow temperature of the cooling water can be detected, for example, a location in the circulation path 4 corresponding to an outlet for the cooling water in the heat exchanger 2. Possible examples of the second temperature detector 9 are thermocouple and thermistor temperature detecting elements, or the like.

The controller 11 controls each configuration of the fuel cell system 100. For example, the controller 11 controls the output (discharge quantity) of the circulation pump 5 on the basis of the second detected temperature. A component having a control function is sufficient for the controller 11, provided with a computation processing unit (not depicted) and a storage unit (not depicted) that stores a control program. An example of the computation processing unit is an MPU or a CPU. An example of the storage unit is a memory. The controller may be constituted by an individual controller that performs centralized control, or may be constituted by a plurality of controllers that cooperate with each other to perform distributed control.

<Method for Operating Fuel Cell System>

Figure 2:
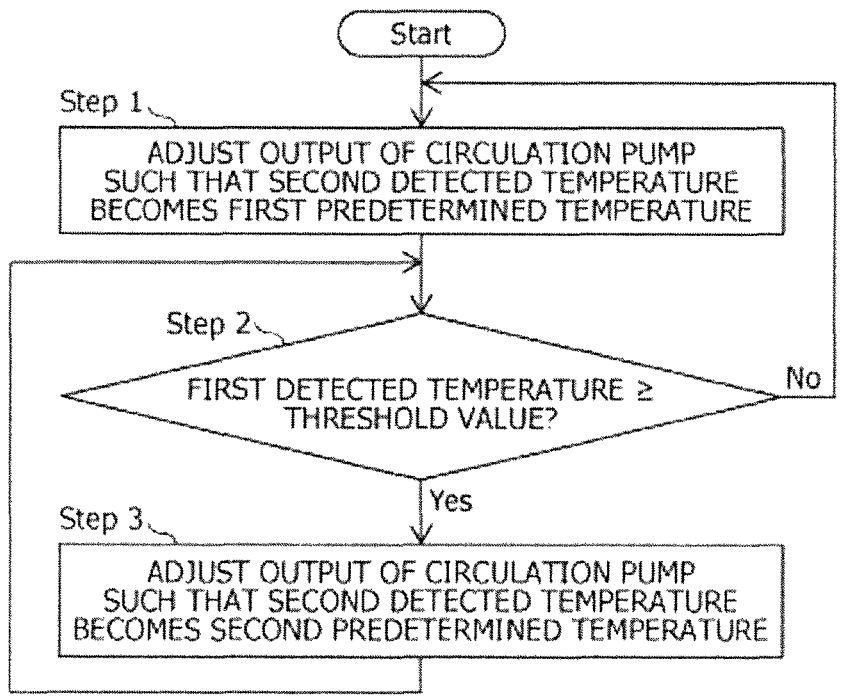
FIG. 2 is a flow diagram depicting an example of a method for operating the fuel cell system of FIG. 1.

Next, a method for operating the fuel cell system 100 according to embodiment 1 of the present disclosure will be described with reference to FIG. 2. FIG. 2 is a flow diagram depicting an example of a method for operating the fuel cell system 100 according to embodiment 1. This method for operating the fuel cell system 100 is controlled by the controller 11.

First, the controller 11 adjusts the output of the circulation pump 5 such that the temperature (second detected temperature T2) detected by the second temperature detector 9 becomes a first predetermined temperature X (step 1). However, "the second detected temperature T2 becoming the first predetermined temperature X" includes not only the case where the second detected temperature T2 and the first predetermined temperature X completely match but also the case where the second detected temperature T2 is close to the first predetermined temperature X.

The first predetermined temperature X is a predetermined temperature such as 70° C. A possible example of the first predetermined temperature X is a temperature at which the cooling water flowing along the circulation path 4 does not boil, a temperature at which scaling is unlikely to occur in the circulation path 4 due to dissolved substances in the cooling water, or a temperature at which the circulation path 4 and the devices provided thereon are unlikely to be damaged by the heat of the cooling water.

Specifically, the controller 11 acquires the second detected temperature T2 from the second temperature detector 9, compares the second detected temperature T2 and the first predetermined temperature X, and adjusts the output of the circulation pump 5 on the basis of the comparison result by means of feedback control.

$$Q1 = \Sigma Cp \times m \times \Delta T \quad \text{(expression 1)}$$

$$\Delta T = T2 - T1 \quad \text{(expression 2)}$$

Q1: Amount of heat received by the cooling water from the exhaust gas (W)
Cp: Specific heat (J/(kg·K))
m: Flow rate of the cooling water (kg/s)
T1: Inflow temperature of the cooling water (first detected temperature) (K)
T2: Outflow temperature of the cooling water (second detected temperature) (K)

The temperature (inflow temperature) T1 of the cooling water flowing into the heat exchanger 2 and the cooling water flow rate m are fixed, for example. In this case, when the amount of heat (amount of exhaust heat) Q1 of the exhaust gas from the fuel cell 1 increases, an in-out temperature difference $\Delta T$ of the cooling water increases (the abovementioned expression 1). Thus, as indicated in the abovementioned expression 2, the temperature (outflow temperature) T2 of the cooling water flowing out from the heat exchanger 2 rises, and the second detected temperature T2 becomes higher than the first predetermined temperature X. In response, the controller 11 controls the circulation pump 5 for the cooling water flow rate m to increase such that the second detected temperature T2 becomes the first predetermined temperature X, that is, $\Delta T$ becomes a specified value.

On the other hand, when the amount of exhaust heat Q1 of the fuel cell 1 decreases, the in-out temperature difference $\Delta T$ of the cooling water decreases, and the second detected temperature T2 becomes lower than the first predetermined temperature X (the abovementioned expressions 1 and 2). In response, the controller 11 controls the circulation pump 5 for the cooling water flow rate m to decrease such that the second detected temperature T2 becomes the first predetermined temperature X, that is, $\Delta T$ becomes the specified value.

Next, in the case where the temperature (first detected temperature T1) detected by the first temperature detector 8 is equal to or greater than a threshold value Y (step 2: yes), the controller 11 adjusts the output of the circulation pump 5 such that the second detected temperature T2 becomes a second predetermined temperature Z (step 3). It should be noted that "the second detected temperature T2 becoming the second predetermined temperature Z" includes not only the case where the second detected temperature T2 and the second predetermined temperature Z completely match but also the case where the second detected temperature T2 is close to the second predetermined temperature Z.

The threshold value Y is a predetermined temperature, and, for example, is an inflow temperature of the cooling water at which it is possible for the exhaust gas to be cooled to a water self-sustainable temperature in the heat exchanger 2. Furthermore, the second predetermined temperature Z is a predetermined temperature, and is a temperature that is higher than the first predetermined temperature X. The second predetermined temperature Z is a temperature at which the cooling water does not boil such as 90° C., or is a temperature that is lower than the heat resistance temperatures of the devices provided on the circulation path 4 such as 80° C.

Specifically, the controller 11 acquires the first detected temperature T1 from the first temperature detector 8, and determines whether or not the first detected temperature T1 is equal to or greater than the threshold value Y (step 2). If the first detected temperature T1 is less than the threshold value Y (step 2: no), the cooling water can sufficiently cool the exhaust gas to a water self-sustainable temperature, and condensed water of an amount required for water self-sustainability can be acquired. Therefore, the controller 11 returns to the processing of step 1, and repeats the processing of steps 1 and 2.

On the other hand, if the first detected temperature T1 is equal to or greater than the threshold value Y (step 2: yes), the cooling water cannot cool the exhaust gas to a water self-sustainable temperature, and the condensed water decreases. Therefore, the controller 11 acquires the second detected temperature T2 from the second temperature detector 9, and adjusts the output of the circulation pump 5 by means of feedback control such that the second detected temperature T2 becomes the second predetermined temperature Z. Thus, the heat dissipation capability of the heat dissipator 6 is increased, thereby lowering the temperature of the cooling water flowing out from the heat dissipator 6 and flowing into the heat exchanger 2, and suppressing the first detected temperature T1 to less than the threshold value Y. The amount of heat exchange Q2 between the cooling water and air, which represents this heat dissipation capability of the heat dissipator 6, is indicated in the following expression 3.

$$Q2 = K \times A \times \Delta Tx \quad \text{(expression 3)}$$

Q2: Amount of heat exchange between the cooling water and air (W)
K: Overall heat transfer rate (W/(m$^2$·K))
A: Heat transfer area (m$^2$)
ΔTx: Logarithmic mean temperature difference (K)

In other words, when the second detected temperature T2 rises from the first predetermined temperature X to the second predetermined temperature Z, in the heat dissipator 6, the temperature of the in-flowing cooling water rises, and, together with this, the logarithmic mean temperature difference ΔTx in the abovementioned expression 3 increases. The logarithmic mean temperature difference ΔTx is a temperature difference that takes the in-out temperature difference of cooling water and the in-out temperature difference of air into consideration, and is indicated by (ΔTi−ΔTo)/ln(ΔTi/ΔTo). ΔTi is the temperature difference between the cooling water and air at the cooling-water inflow port side in the heat dissipator 6. ΔTo is the temperature difference between the cooling water and air at the cooling-water outflow port side in the heat dissipator 6.

Furthermore, when the second detected temperature T2 rises from the first predetermined temperature X to the second predetermined temperature Z, the temperature difference ΔT increases from the abovementioned expression 2 in the heat exchanger 2. In response, since the amount of heat Q1 of the cooling water indicated in the abovementioned expression 1 is fixed, the flow rate m of the cooling water in the circulation path 4 decreases in accordance with the increase in the temperature difference ΔT. The overall heat transfer rate K in the abovementioned expression 3 is dependent upon this cooling water flow rate m, and the overall heat transfer rate K decreases together with the decrease in the flow rate m.

In this way, when the second detected temperature T2 rises, the logarithmic mean temperature difference ΔTx increases, whereas the overall heat transfer rate K decreases. However, the amount of increase in the logarithmic mean temperature difference ΔTx is greater than the amount of decrease in the overall heat transfer rate K, and therefore the amount of heat exchange Q2 in the heat dissipator 6 of the abovementioned expression 3 increases. Thus, the heat dissipation capability of the heat dissipator 6 rises, the temperature of the cooling water decreases due to the heat dissipator 6, and the first detected temperature T1 is suppressed to less than the threshold value Y.

The controller 11 then returns to the processing of step 2, and repeats the processing of steps 1 to 3 at a predetermined or arbitrary timing.

According to the abovementioned configuration, in the case where the first detected temperature T1 is equal to or greater than the threshold value Y, the output of the circulation pump 5 is adjusted such that the second detected temperature T2 becomes the second predetermined temperature Z, which is higher than the first predetermined temperature X. Thus, the logarithmic mean temperature difference ΔTx of the heat dissipator 6 is increased, and the amount of heat transferred between the cooling water and air in the heat dissipator 6 is increased. Thus, the heat dissipation capability of the heat dissipator 6 is improved for the first detected temperature T1 to be able to be suppressed to less than the threshold value Y. As a result, the exhaust gas is cooled to a water self-sustainable temperature in the heat exchanger 2, condensed water of an amount required for water self-sustainability is recovered, and water self-sustainability of the fuel cell system 100 is enabled.

Furthermore, the power generated by the fuel cell 1 does not decrease even if the first detected temperature T1 becomes equal to or greater than the threshold value Y. Therefore, power can be generated at an output corresponding to the demand of the user, and a decline in convenience caused by a decrease in the power generated can therefore be suppressed.

In addition, the heat dissipation capability of the heat dissipator 6 does not improve by increasing the functionality of the heat dissipator 6 such as increasing the size and increasing the air flow rate. Therefore, it is possible to suppress an increase in cost for the fuel cell system 100 caused by an increase in the functionality of the heat dissipator 6.

Furthermore, a high heat dissipation capability is obtained in the heat dissipator 6, and therefore it is also feasible for the fuel cell system 100 to be operated with the logarithmic mean temperature difference ΔTx constantly at maximum. In this case, since the circulation pump 5 is controlled such that the second detected temperature T2 becomes the second predetermined temperature Z, the temperature of the cooling water flowing out from the heat exchanger 2 increases. Therefore, if high-temperature cooling water flows for a long time through the circulation path 4 and devices such as the circulation pump 5 and valves (not depicted) provided on the circulation path 4, problems occur such as thermal deterioration of the devices and the occurrence of scaling in the circulation path 4. In response, when the first detected temperature T1 is less than the threshold value Y, the circulation pump 5 is controlled such that the second detected temperature T2 becomes the first predetermined temperature X, and therefore the temperature of the cooling water in the circulation path 4 is suppressed low and the aforementioned problems can be avoided.

Modified Example 1 of Embodiment 1

Figure 3:
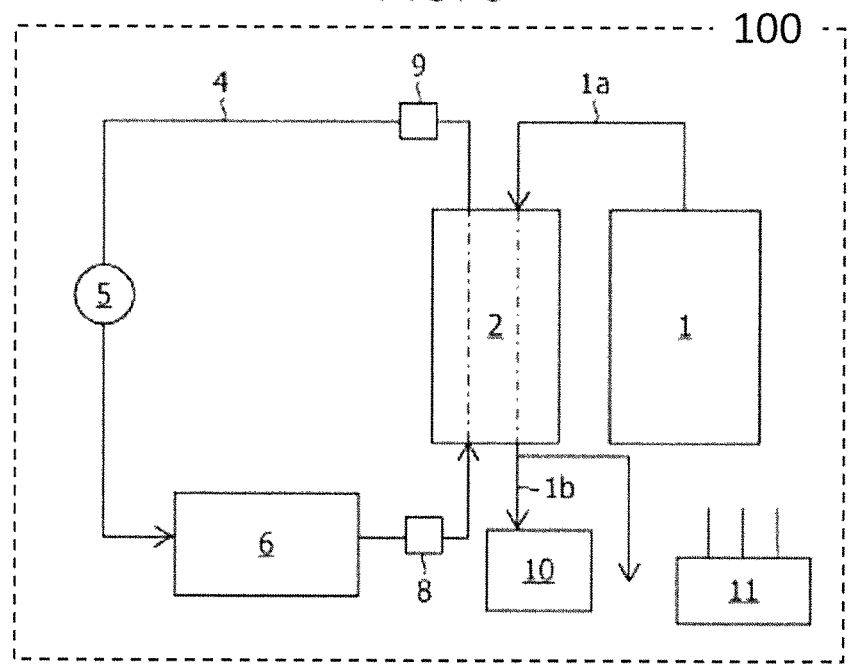
FIG. 3 is a block diagram schematically depicting an example of a configuration of a fuel cell system according to modified example 1 of embodiment 1 of the present disclosure.

A configuration of the fuel cell system 100 according to modified example 1 of embodiment 1 will be described with reference to FIG. 3. The fuel cell system 100 according to modified example 1 of embodiment 1 is further provided with a condensed water tank 10 in addition to the configuration of embodiment 1.

The condensed water tank 10 is a tank that stores condensed water produced by the exhaust gas discharged from the fuel cell 1 being cooled by the heat exchanger 2. The condensed water tank 10 is connected to a condensed water path 1b that branches from the exhaust gas path 1a.

When the exhaust gas is cooled to a water self-sustainable temperature by the cooling water in the heat exchanger 2, the moisture in the cooling water condenses. This condensed water flows into the condensed water tank 10 by means of the condensed water path 1b and is stored. Thus, the condensed water can be used for an appropriate use without being discharged to the external environment.

Modified Example 2 of Embodiment 1

Figure 4:
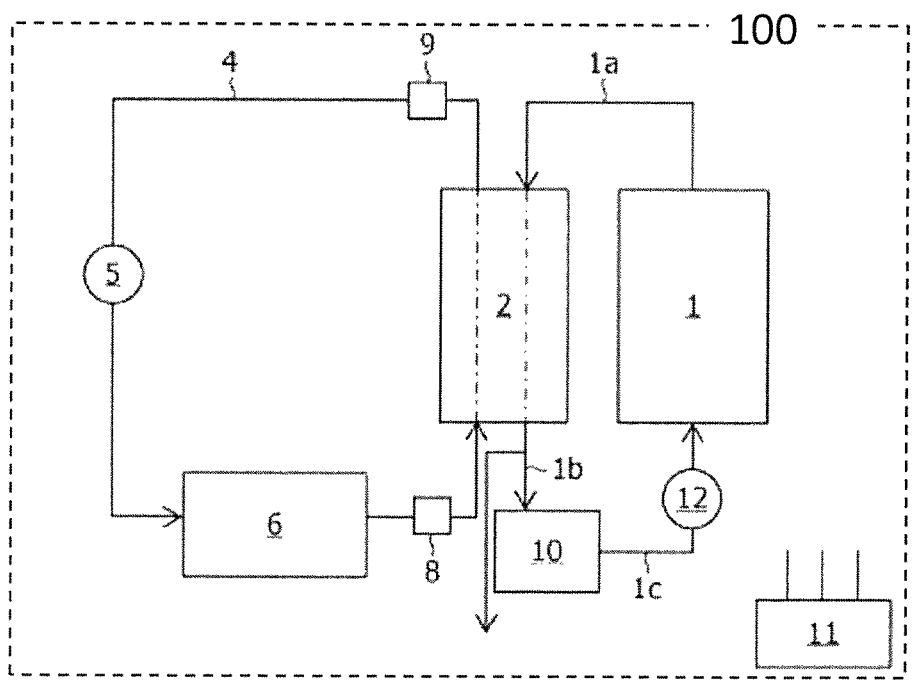
FIG. 4 is a block diagram schematically depicting an example of a configuration of a fuel cell system according to modified example 2 of embodiment 1 of the present disclosure.

A configuration of the fuel cell system 100 according to modified example 2 of embodiment 1 will be described with reference to FIG. 4. The fuel cell system 100 according to modified example 2 of embodiment 1 is further provided with a supply pump 12 in addition to the configuration of modified example 1 of embodiment 1.

The supply pump 12 is a pump that supplies condensed water from the condensed water tank 10 to the fuel cell 1. The supply pump 12 is provided on a supply path 1c, and the supply path 1c is connected to the fuel cell 1 and the condensed water tank 10.

Condensed water stored in the condensed water tank 10 is supplied to the fuel cell 1 by the supply pump 12 via the supply path 1c. The condensed water is then used as reforming water for reforming a raw material in the reformer of the fuel cell 1. Thus, a water self-sustaining operation becomes possible without an external water supply.

It should be noted that the supply pump 12 may be provided in the fuel cell system 100 of embodiment 1. In this case, the supply path 1c on which the supply pump 12 is provided branches from the exhaust gas path 1a and is connected to the fuel cell 1.

Embodiment 2

Figure 5:
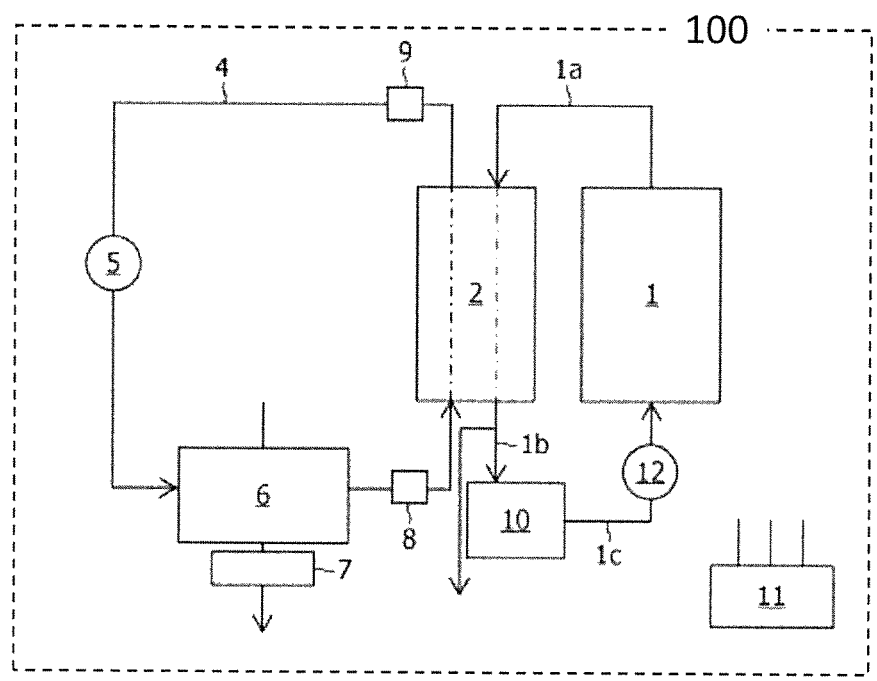
FIG. 5 is a block diagram schematically depicting an example of a configuration of a fuel cell system according to embodiment 2 of the present disclosure.

A configuration of the fuel cell system 100 according to embodiment 2 will be described with reference to FIG. 5. FIG. 5 is a block diagram schematically depicting an example of a configuration of the fuel cell system 100 according to embodiment 2. The fuel cell system 100 according to embodiment 2 is further provided with a heat-dissipating fan 7 in addition to the configuration of embodiment 1. It should be noted that the operation method depicted in FIG. 2 can be used as the method for operating the fuel cell system 100.

The heat-dissipating fan 7 is a fan that blows air to the heat dissipator 6. The heat-dissipating fan 7 may be a suction type that draws in air toward the heat dissipator 6, or may be a blowing type that blows air toward the heat dissipator 6. Air is introduced to the heat dissipator 6 by the heat-dissipating fan 7, and the heat-dissipating effect in the heat dissipator 6 is enhanced. It is thereby possible to maintain or reduce the size of the heat dissipator 6.

Modified Example 1 of Embodiment 2

In the fuel cell system 100 according to modified example 1 of embodiment 2, the controller 11 is configured so as to, when the first detected temperature T1 is equal to or greater than the threshold value Y, adjust the output of the heat-dissipating fan 7 such that the first detected temperature T1 becomes less than the threshold value Y, before adjusting the output of the circulation pump 5 such that the second detected temperature T2 becomes the second predetermined temperature Z. The fuel cell system 100 is provided with the configuration depicted in FIG. 5. The output of the heat-dissipating fan 7 is variable and is controlled by the controller 11.

Figure 6:
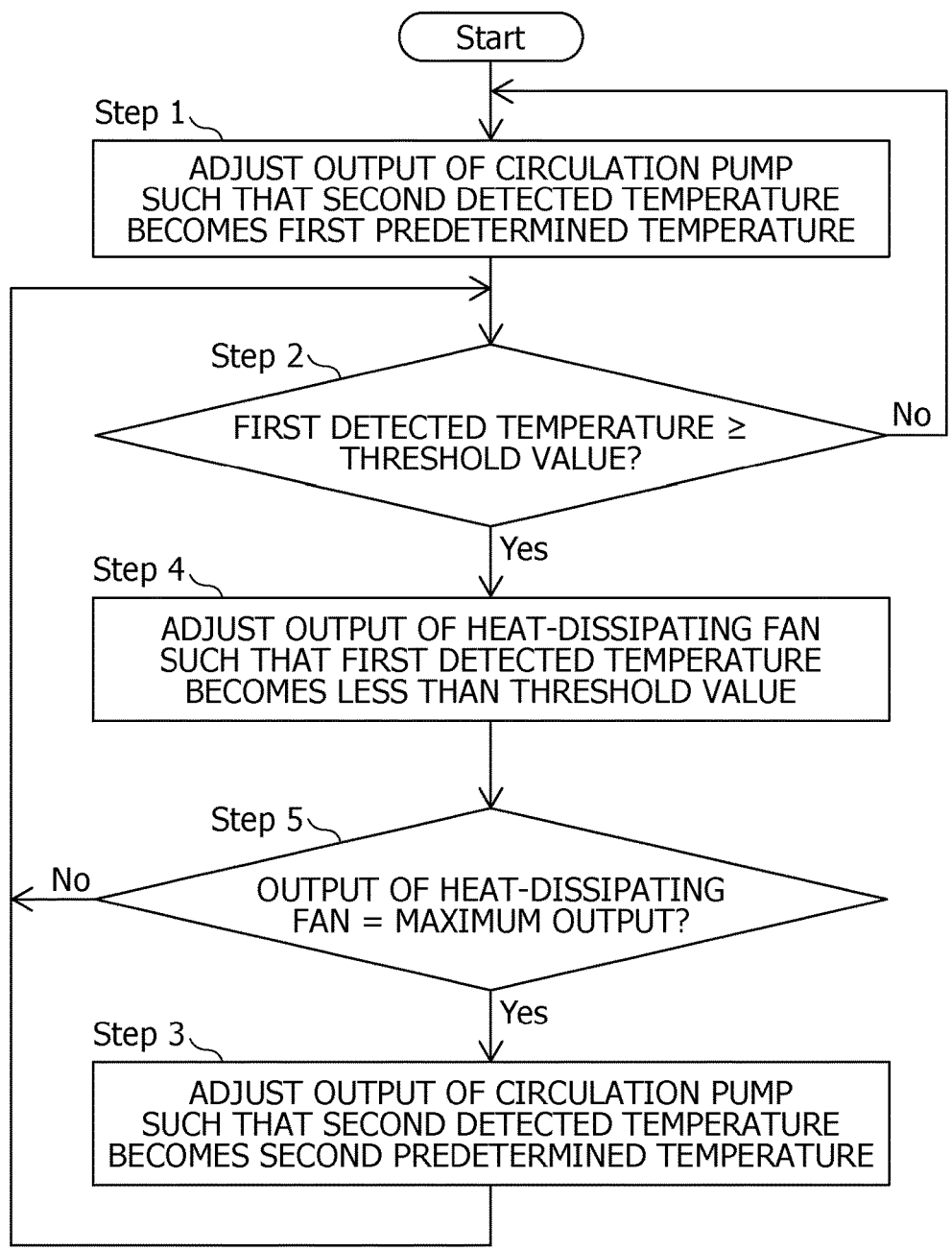
FIG. 6 is a flow diagram depicting an example of a method for operating a fuel cell system according to modified example 1 of embodiment 2 of the present disclosure.

Furthermore, the operation method depicted in FIG. 6 can be used for the fuel cell system 100. In this operation method, the processing of steps 4 and 5 is additionally carried out between steps 2 and 3 of the operation method of FIG. 2.

Specifically, the controller 11 adjusts the output of the circulation pump 5 such that the second detected temperature T2 becomes the first predetermined temperature X (step 1). In this process, the controller 11 monitors whether or not the first detected temperature T1 is equal to or greater than the threshold value Y (step 2). Here, if the first detected temperature T1 is less than the threshold value Y (step 2: no), the controller 11 repeats the processing of step 1.

However, if the first detected temperature T1 becomes equal to or greater than the threshold value Y (step 2: yes), the controller 11 adjusts the output of the heat-dissipating fan 7 such that the first detected temperature T1 becomes less than the threshold value Y. Therefore, the controller 11 acquires the first detected temperature T1 from the first temperature detector 8, and implements an adjustment such that the output of the heat-dissipating fan 7 is increased until the first detected temperature T1 becomes less than the threshold value Y (step 4).

However, if the output of the heat-dissipating fan 7 is the maximum output, the output of the heat-dissipating fan 7 cannot be further increased. Therefore, the controller 11 acquires the output of the heat-dissipating fan 7, and determines whether or not this output is the maximum output (step 5). If the output of the heat-dissipating fan 7 is less than the maximum output (step 5: no), the operation returns to the processing of step 2. However, if the output of the heat-dissipating fan 7 has reached the maximum output (step 5: yes), the output of the circulation pump 5 is adjusted such that the second detected temperature T2 becomes the second predetermined temperature Z (step 3). The operation then returns to the processing of step 2. This kind of processing of steps 1 to 5 is repeated at a predetermined or arbitrary timing.

According to the abovementioned configuration, in the case where the first detected temperature T1 is equal to or greater than the threshold value Y, the output of the heat-dissipating fan 7 is adjusted such that the first detected temperature T1 becomes less than the threshold value Y, and then the output of the circulation pump 5 is adjusted such that the second detected temperature T2 becomes the second predetermined temperature Z. Thus, the heat dissipation enhancing function of the heat-dissipating fan 7 is utilized to the utmost, and then the temperature of the cooling water flowing along the circulation path 4 is increased. Therefore, it is possible to suppress high-temperature cooling water flowing in the circulation path 4.

Embodiment 3

Figure 7:
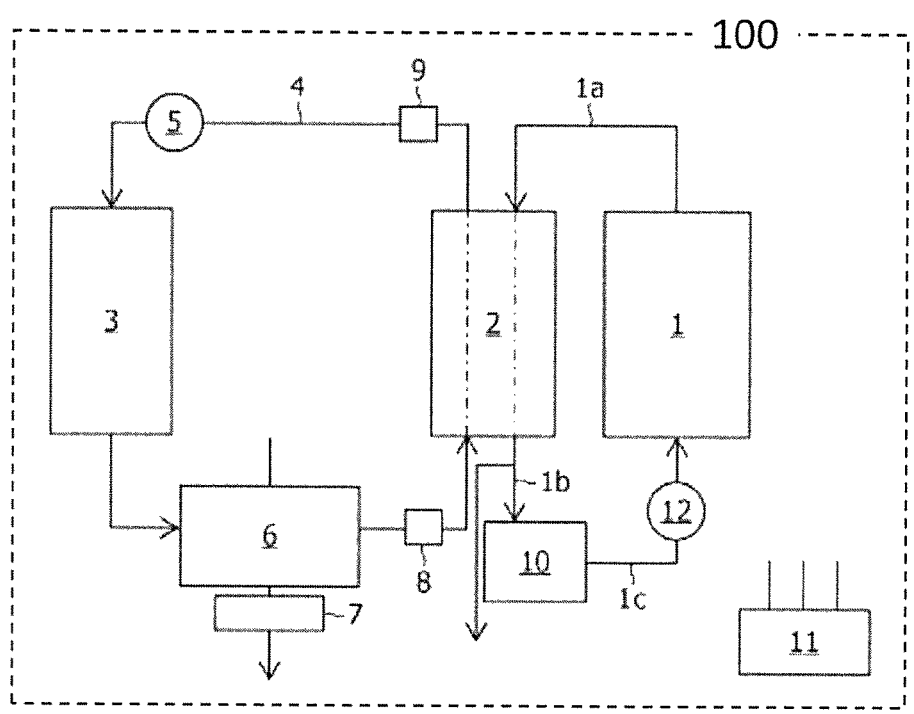
FIG. 7 is a block diagram schematically depicting an example of a configuration of a fuel cell system according to embodiment 3 of the present disclosure.

A configuration of the fuel cell system 100 according to embodiment 3 will be described with reference to FIG. 7. FIG. 7 is a block diagram schematically depicting an example of a configuration of the fuel cell system 100 according to embodiment 3. The fuel cell system 100 according to embodiment 3 is further provided with a hot water storage tank 3 in addition to the configuration of modified example 1 of embodiment 2. Furthermore, the operation method depicted in FIG. 6 can be used as the method for operating the fuel cell system 100.

The hot water storage tank 3 is a tank that is provided on the circulation path 4, and stores heat recovered from the heat exchanger 2. The hot water storage tank 3, for example, is arranged downstream of the circulation pump 5 and upstream of the heat dissipator 6, and is connected to the circulation path 4. A layered tank in which high-temperature cooling water is sequentially stored from the top is used as the hot water storage tank 3, for example. In this hot water storage tank 3, the upper section is a layer for high-temperature cooling water, and the lower section is a layer for low-temperature cooling water. Thus, the circulation path 4 is connected to the hot water storage tank 3 such that high-temperature cooling water heated by the heat exchanger 2 flows into the upper section of the hot water storage tank 3, and low-temperature cooling water in the lower section of the hot water storage tank 3 flows from the hot water storage tank 3 to the circulation path 4. It should be noted that the hot water storage tank 3 is not restricted to this layered tank, and may be a tank in which the temperature of the cooling water is uniform.

Furthermore, the hot water storage tank 3 may be a tank through which the cooling water of the circulation path 4 passes rather than a tank in which the cooling water of the circulation path 4 is stored. In this case, the circulation path 4 passes through the hot water storage tank 3. The cooling water flowing along the circulation path 4 then passes through the hot water storage tank 3, and, in this process, is subjected to heat exchange with the water stored in the hot water storage tank 3. Thus, the water in the hot water storage tank 3 is heated, and the cooling water in the circulation path 4 is cooled and flows to the heat dissipator 6.

According to the abovementioned configuration, the hot water storage tank 3 is provided in the fuel cell system 100. Therefore, exhaust heat from the fuel cell 1 can be stored in the hot water storage tank 3 as hot water, and the economic efficiency of the fuel cell system 100 is improved.

The fuel cell system 100 according to embodiment 3 depicted in FIG. 7 is further provided with the hot water storage tank 3 in the configuration of modified example 1 of embodiment 2; however, it should be noted that the present disclosure is not restricted thereto. For example, the fuel cell system 100 according to embodiment 3 may be further provided with the hot water storage tank 3 in the configurations of embodiment 1, modified examples 1 and 2 thereof, and embodiment 2.

It should be noted that all of the abovementioned embodiments may be combined with one another provided they do not exclude one another.

Many improvements and other embodiments of the present disclosure will be clear to a person skilled in the art from the above description. Consequently, the above description is to be interpreted only as an exemplification, and has been provided for the purpose of instructing the best mode for carrying out the present disclosure to persons skilled in the art. The details of the structure and/or function of the present disclosure can be substantially altered without deviating from the spirit of the present disclosure.

A fuel cell system of the present disclosure is useful as a fuel cell system with which a decline in convenience and an increase in cost are suppressed and water self-sustainability is possible.

What is claimed is:

1. A fuel cell system, comprising:
   a fuel cell that generates electricity by a hydrogen and oxygen reaction;
   a heat exchanger that causes heat to be exchanged between an exhaust gas discharged from the fuel cell and cooling water;
   a heat dissipator that causes heat to be dissipated from the cooling water;
   a circulation path along which the cooling water circulates between the heat exchanger and the heat dissipator;
   a circulation pump that causes the cooling water to be circulated along the circulation path;
   a first temperature detector that detects a temperature of the cooling water flowing into the heat exchanger;
   a second temperature detector that detects a temperature of the cooling water flowing out from the heat exchanger; and
   a controller,
   wherein the controller is configured so as to
   adjust an output of the circulation pump such that the temperature detected by the second temperature detector becomes a first predetermined temperature,
   and, when the temperature detected by the first temperature detector is equal to or greater than a threshold value, adjust the output of the circulation pump such that the temperature detected by the second temperature detector becomes a second predetermined temperature that is higher than the first predetermined temperature.

2. The fuel cell system according to claim 1, further comprising:
   a hot water storage tank that is provided on the circulation path, and stores heat recovered from the heat exchanger.

3. The fuel cell system according to claim 1, further comprising:
   a condensed water tank that stores condensed water produced by the exhaust gas discharged from the fuel cell being cooled by the heat exchanger.

4. The fuel cell system according to claim 3, further comprising:
   a supply pump that supplies the condensed water from the condensed water tank to the fuel cell.

5. The fuel cell system according to claim 1, further comprising:
   a heat-dissipating fan that blows air to the heat dissipator.

6. The fuel cell system according to claim 5,
   wherein the controller is configured so as to, when the temperature detected by the first temperature detector is equal to or greater than the threshold value, adjust an output of the heat-dissipating fan such that the temperature detected by the first temperature detector becomes less than the threshold value, before adjusting the output of the circulation pump such that the temperature detected by the second temperature detector becomes the second predetermined temperature.

* * * * *